(12) United States Patent
Wang et al.

(10) Patent No.: US 12,055,048 B2
(45) Date of Patent: Aug. 6, 2024

(54) METHOD FOR ROTOR BLADE TIP CLEARANCE CONTROL AND ROTOR BLADE MANUFACTURED BY THE METHOD

(71) Applicants: AECC SHANGHAI COMMERCIAL AIRCRAFT ENGINE MANUFACTURING CO., LTD., Shanghai (CN); AECC COMMERCIAL AIRCRAFT ENGINE CO., LTD., Shanghai (CN)

(72) Inventors: Jiaguang Wang, Shanghai (CN); Shuhui Hu, Shanghai (CN); Wen Qin, Shanghai (CN); Chuanjun Cao, Shanghai (CN); Zhiqing Wu, Shanghai (CN)

(73) Assignees: AECC SHANGHAI COMMERCIAL AIRCRAFT ENGINE MANUFACTURING CO., LTD., Shanghai (CN); AECC COMMERCIAL AIRCRAFT ENGINE CO., LTD., Shanghai (CN)

( * ) Notice: Subject to any disclaimer, the term of this patent is extended or adjusted under 35 U.S.C. 154(b) by 0 days.

(21) Appl. No.: 18/251,761

(22) PCT Filed: Oct. 22, 2021

(86) PCT No.: PCT/CN2021/125466
§ 371 (c)(1),
(2) Date: May 4, 2023

(87) PCT Pub. No.: WO2022/095720
PCT Pub. Date: May 12, 2022

(65) Prior Publication Data
US 2024/0011409 A1 Jan. 11, 2024

(30) Foreign Application Priority Data

Nov. 5, 2020 (CN) .......................... 202011220075.2

(51) Int. Cl.
*F01D 11/22* (2006.01)
*B23P 15/00* (2006.01)
(Continued)

(52) U.S. Cl.
CPC ............ *F01D 11/22* (2013.01); *B23P 15/006* (2013.01); *B23P 15/02* (2013.01); *F01D 5/021* (2013.01);
(Continued)

(58) Field of Classification Search
CPC ... F01D 5/021; F01D 5/14; F01D 5/20; F01D 11/14; F01D 11/22; F01D 21/003;
(Continued)

(56) References Cited

U.S. PATENT DOCUMENTS

| 5,725,354 A | 3/1998 | Wadia et al. | |
| 2013/0121834 A1* | 5/2013 | Barnett | F01D 5/02 |
| | | | 416/204 A |

(Continued)

FOREIGN PATENT DOCUMENTS

| CN | 1580495 A | 2/2005 |
| CN | 111306111 A | 6/2020 |

(Continued)

OTHER PUBLICATIONS

English machine translation of RU 2354854C1, Nov. 25, 2023.*
(Continued)

*Primary Examiner* — Christopher Verdier
(74) *Attorney, Agent, or Firm* — Maier & Maier, PLLC

(57) ABSTRACT

A rotor blade tip clearance control method and a rotor blade manufactured using same. The control method includes:
(Continued)

coinciding, along an axial direction of an aircraft engine, a center of gravity of a rotor blade with a center of gravity of a rotor wheel disk supporting the rotor blade; rotating the rotor wheel disk to measure a leading edge deformation amount of the rotor blade; measuring a trailing edge deformation amount of the rotor blade; comparing the deformation amounts; and adjusting the center of gravity of the rotor wheel disk until the leading edge deformation amount tends to be approximately equal to the trailing edge deformation amount. The method can effectively improve or even solve the problem of inconsistent radial displacements of a leading edge and a trailing edge during the operation.

6 Claims, 4 Drawing Sheets

(51) Int. Cl.
| | |
|---|---|
| B23P 15/02 | (2006.01) |
| F01D 5/02 | (2006.01) |
| F01D 5/14 | (2006.01) |
| F01D 11/14 | (2006.01) |
| F01D 21/00 | (2006.01) |
| F04D 19/00 | (2006.01) |
| F04D 27/00 | (2006.01) |
| F04D 29/32 | (2006.01) |

(52) U.S. Cl.
CPC ............ *F01D 11/14* (2013.01); *F01D 21/003* (2013.01); *F04D 19/002* (2013.01); *F04D 27/001* (2013.01); *F04D 29/324* (2013.01); *F01D 5/14* (2013.01); *F05D 2220/323* (2013.01); *F05D 2230/80* (2013.01); *F05D 2240/55* (2013.01); *F05D 2260/83* (2013.01); *Y10T 29/49336* (2015.01); *Y10T 29/49771* (2015.01)

(58) Field of Classification Search
CPC ........ F01D 21/04; F04D 19/00; F04D 19/002; F04D 29/321; F04D 29/324; F04D 29/32; F04D 27/001; F05D 2260/83; B23P 15/006; B23P 15/02; Y10T 29/49336; Y10T 29/49771
See application file for complete search history.

(56) References Cited

U.S. PATENT DOCUMENTS

| | | | |
|---|---|---|---|
| 2014/0112757 | A1 | 4/2014 | Bacic et al. |
| 2020/0109634 | A1* | 4/2020 | Gondre .................. B29C 70/48 |

FOREIGN PATENT DOCUMENTS

| | | | |
|---|---|---|---|
| CN | 112032105 | A | 12/2020 |
| GB | 191208713 | A | 11/1912 |
| GB | 659163 | A | 10/1951 |
| GB | 983480 | A | 2/1965 |
| GB | 1215300 | A | 12/1970 |
| RU | 674487 | A1 | 2/1995 |
| RU | 2354854 | C1 | 5/2009 |

OTHER PUBLICATIONS

International Search Report issued on Jan. 27, 2022, in corresponding International Patent Application No. PCT/CN2021/125466, 6 pages.

Office Action issued on Dec. 14, 2020, in corresponding Chinese Application No. 202011220075.2, 14 pages.

* cited by examiner

METHOD FOR ROTOR BLADE TIP CLEARANCE CONTROL AND ROTOR BLADE MANUFACTURED BY THE METHOD

TECHNICAL FIELD

The invention relates to a method for controlling rotor blade tip clearance and a rotor blade manufactured by the method.

BACKGROUND

A compressor is a component of a gas turbine engine which performs work on the air by rotating impeller blades (or rotor blades) at high speed to raise the air pressure. A booster stage is a compressor stage provided between a fan and the compressor to improve the aerodynamic performance of the fan at the front of the compressor and also increase the pressure at an inlet of the compressor. Booster compressors are often used in aeroengines. A front part (or named as 'blade tip' or 'rotor blade tip') of the rotor blade usually has a curved shape, so as to introduce the gas into the working rotor with impact, reducing the kinetic energy loss caused by airflow impact.

A compressor casing is provided with an inlet and an outlet for the entry and exit of airflow. The inlet of the casing is usually provided axially, and its flow channel is provided in a slightly tapered type to reduce the resistance on the airflow entering. The outlet of the casing is usually designed to have a spiral shape, with the flow channel expanding along a circumferential direction, so as to continue diffusing the high-speed airflow therein, improving the overall efficiency of the booster compressor.

The rotor blades rotating at high speed operate in an airflow channel formed by a combination of the casing, a hub, etc. In order to avoid heating due to friction or damage to the rotor blades due to collision, a certain radial gap is usually provided between the blade tip and an inner wall of the casing. This radial clearance is called 'rotor blade tip clearance'. It is known that the size of the rotor blade tip clearance has a great influence on the stable working range of the compressor and the aerodynamic performance parameters (such as efficiency, margin, etc.) of its compressing component. Obviously, the rotor blade tip clearance is neither as small as possible, nor as large as possible. For each specific compressor, there is an optimal rotor blade tip clearance. When the compressor operates with the optimal rotor tip clearance, it will have the largest stable working range and the best aerodynamic performance parameters.

At present, the rotor blade tip clearance usually has the following problems during the operation of the compressing component of the booster compressor:

When designing the airfoil of the rotor blade, the aerodynamic performance and the stress on the airfoil are mainly considered, and sometimes the difference in the radial deformation of the airfoil of the rotor blade along the direction of chord length would not be taken into account, so the radial displacement of a leading edge and a trailing edge of the blade tip are different during operation, resulting in the problem that the rotor blade tip clearance at one end is relatively large and the rotor blade tip clearance at the other end is relatively small.

Generally, the end where the rotor blade tip clearance is relatively large will lead to airflow leakage at the blade tip, thereby affecting the aerodynamic performance of the compressing component; and the end where the rotor blade tip clearance is relatively small will lead to an unexpected risk of scraping the inner wall of the casing, especially when scraping the casing coated with wear-resistant coating unexpectedly, the safe operation of the aeroengine will be affected seriously.

Currently, there are several methods of controlling the rotor blade tip clearance in the prior art.

For example, the PCT international application WO2016/063604 filed by Mitsubishi Heavy Industries Co., Ltd. on Aug. 18, 2015 (entered the domestic stage in China on Dec. 15, 2016, the application number is 201580032222.4) discloses an axial flow turbine and a booster compressor, wherein the axial flow turbine is provided with: a rotor having a plurality of rotor blades on an outer periphery thereof; and a stationary member provided on the outer periphery side of the rotor and having an annular wall face facing the tip face of each rotor blade. When the axial flow turbine is stopped, the clearance between the annular wall face and the tip face on the trailing edge side of the rotor blade is greater than that of the leading edge side of the rotor blade.

However, the clearance between the wall face and the blade tip is mainly adjusted by deforming the wall face by force. This requires an additional control device, which not only increases the cost, but also increases the risk of failure on adjustment due to component failure.

Therefore, a method for controlling rotor blade tip clearance is supposed to be provided, which can improve or even solve the problem of inconsistent radial displacements of the leading edge and trailing edge of the rotor blade tip during operation.

SUMMARY

One purpose of the invention is to provide a method for controlling rotor blade tip clearance, which can effectively improve or even solve the problem of inconsistent radial displacements of the leading edge and trailing edge of the rotor blade tip during operation.

Another purpose of the invention is to provide a rotor blade manufactured by the method.

The first aspect of the invention relates to the method for controlling rotor blade tip clearance, used for aeroengines, comprising the following steps:

setting a center of gravity of the rotor blade to be overlapped with a center of gravity of the rotor disk in the axial direction of the aeroengine;
rotating the rotor disk.

The method further comprising:

measuring a leading edge deformation amount of a leading edge of the rotor blade; measuring a trailing edge deformation amount of a trailing edge of the rotor blade; when the difference between the leading edge deformation amount and the trailing edge deformation amount is larger than a specified range, comparing the leading edge deformation amount and the trailing edge deformation amount; and adjusting the center of gravity of the rotor disk according to the results after comparing, until the leading edge deformation amount and the trailing edge deformation amount tends to be approximately the same.

It should be noted that the term 'approximately the same' used herein means that the numerical values have the same order of magnitude and are substantially close to each other within an allowable uncertainty range.

In a preferred embodiment, the center of gravity of the rotor disk is adjusted by offsetting the center of gravity of the rotor disk towards one of the leading edge and the trailing edge which has a smaller deformation amount by a predetermined offset amount.

The term 'which has a smaller deformation amount' refers to one of the leading edge deformation amount and the trailing edge deformation amount which has a smaller numerical value, that is, when the leading edge deformation amount is larger than the trailing edge deformation amount, the term refers to the trailing edge; when the leading edge deformation amount is smaller than the trailing edge deformation amount, the term refers to the leading edge.

Preferably, the predetermined offset amount is determined by a rotating speed of the rotor disk.

In another preferred embodiment, the specified range is specified as follows:

for a blade with a blade height less than 20 mm, the specified range is 0.5%-1.5% of the blade height;

for a blade with a blade height between 20 mm to 40 mm, the specified range is 0.25%-2% of the blade height;

for a blade with a blade height between 40 mm to 100 mm, the specified range is 0.2%-1% of the blade height;

for a blade with a blade height greater than 100 mm, the specified range is 0.2%-0.6% of the blade height.

Specifically, the rotor blade is of a booster compressor.

Additionally, the leading edge deformation amount of the leading edge of the rotor blade and the trailing edge deformation amount of the trailing edge of the rotor blade are measured by a deformation modulus tester.

The second aspect of the invention relates to a rotor blade manufactured by the control method according to the first aspect of the invention, wherein the rotor blade is supported on the rotor disk with a feature of center of gravity offset.

It should be noted that the term 'the feature of center of gravity offset' refers to the feature that presents after the center of gravity of the rotor blade is adjusted in the method for controlling the rotor blade tip clearance by adjusting the center of gravity.

Specifically, in a preferred embodiment, the feature of center of gravity offset is achieved by the predetermined offset amount provided between the center of gravity of the rotor disk and the center of gravity of the rotor blade in the axial direction of the aeroengine.

In another preferred embodiment, the feature of center of gravity offset is achieved by a centerline of symmetry of the rotor disk being substantially perpendicular to the axial direction of the aeroengine.

In another preferred embodiment, the feature of center of gravity offset is achieved by an asymmetric feature of the rotor disk.

The method for controlling the rotor blade tip clearance according to the invention has the following benefits:

(1) the problem of inconsistent radial displacements of the leading edge and trailing edge of the rotor blade tip during operation can be simply solved by offsetting the center of gravity of the rotor disk, without introducing redundant parts and mechanisms;

(2) the aerodynamic performance parameters of the compressing components, especially the efficiency and margin, can be improved by adjusting the different radial clearances between the rotor blade tip and the casing of the booster compressor to be approximately consistent with each other; and (3) while improving the aerodynamic performance parameters of the compressing components, ensuring that the rotor blade tip clearance would not have any negative impact on the safe operation of the aeroengine.

BRIEF DESCRIPTION OF THE DRAWINGS

In order to further illustrate the method for controlling the rotor blade tip clearance according to the present invention and the rotor blade manufactured by the method, the invention will be described in detail below with reference to the accompanying drawings and specific embodiments, wherein.

DETAILED DESCRIPTION

The steps of the method for controlling rotor blade tip clearance according to the present invention, and the structure and effects of the rotor blade manufactured by the method are described below with reference to the accompanying drawings, wherein the same components are denoted by the same reference signs.

Figure 1:
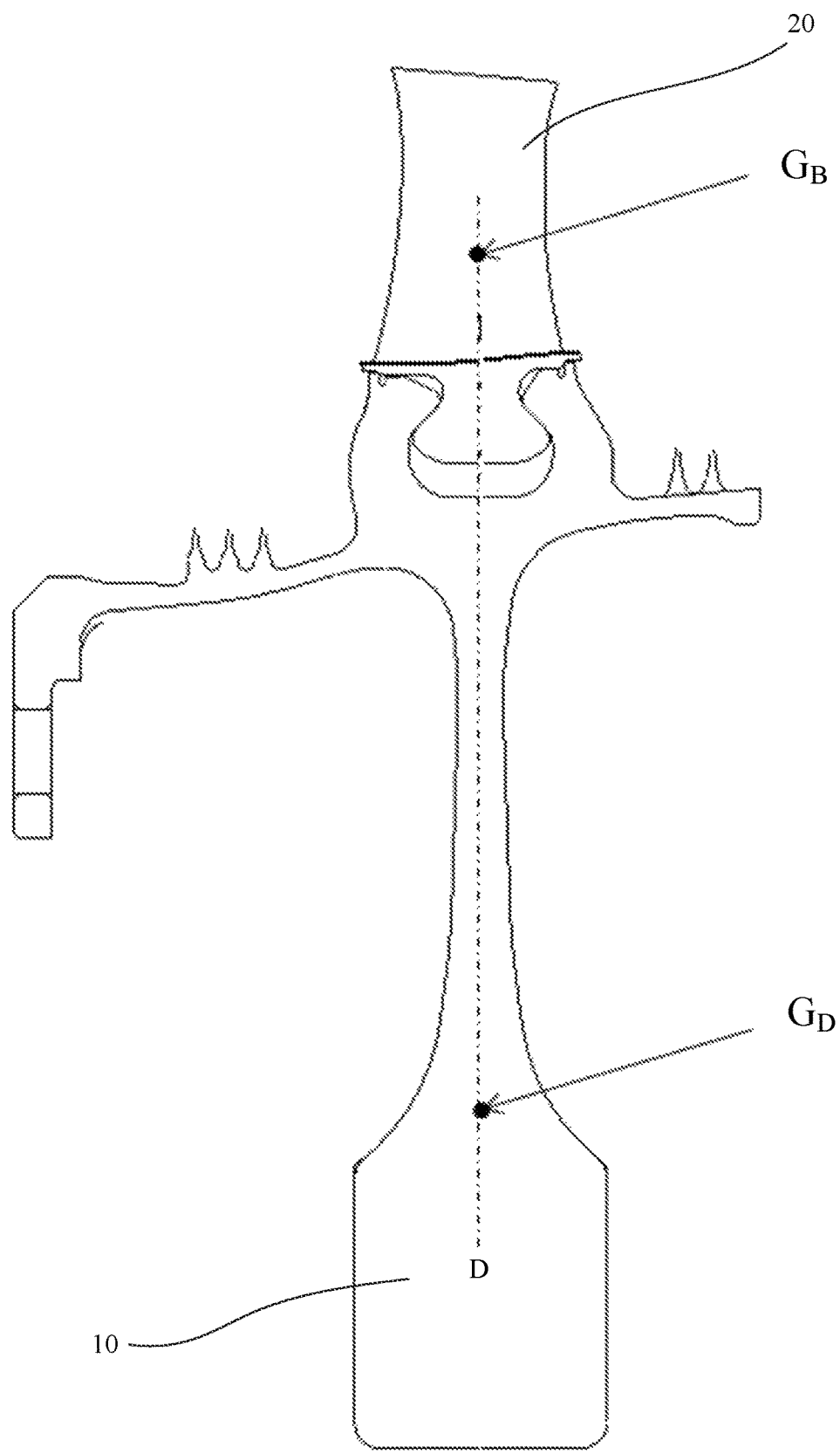
FIG. 1 is a partial cross section diagram of the rotor disk with a single rotor blade mounted thereon, without offsetting the center of gravity of the rotor disk.

FIG. 1 shows a rotor disk 10 without an offset center of gravity, which is provided with a plurality of rotor blades 20. For the convenience of illustration, only one rotor blade 20 is shown in the figure.

It is known that a rotating body supported by a bearing during high-speed rotation is called a rotor, and rotor is the main rotating component in the field of power machinery such as electric motor, generator, gas turbine, turbocompressor and compressor. The rotor can rotate around its axis, the extending direction of the axis is called an axial direction of the rotor, and the direction perpendicular to and extending radially outward from the axis is called a radial direction of the rotor. In the compressor, the rotor disk of the rotor supports a plurality of rotor blades, which are evenly distributed along the circumferential direction of the rotor disk. The rotor blade can be generally separated into three parts: a blade root, a blade body and a blade tip, where the blade root is mounted or integrally formed on the rotor disk, the blade body extends along the radial direction of the rotor with a certain space curvature, and the blade tip is located at the outermost side of the rotor blade.

During the operation of the rotor, the rotor blade 20 perform a circular motion around the axis together with the rotor and the rotor disk 10. Although not shown in the figures, those skilled in the art should understand that a casing, as a casing component covering the outside of the rotor, is mainly used to form an airflow channel. The casing is generally cast or forged from metal or metal alloy, and a certain radial gap is left between the blade tip and the inner wall of the casing, which is a blade rotor tip clearance.

The method for controlling rotor blade tip clearance according to the present invention comprises the following steps:

(i) In the thermal design, a center of gravity $G_B$ of the rotor blade 20 overlaps with a center of gravity $G_D$ of the rotor disk 10 in the axial direction of the aeroengine. As shown in FIG. 1, the dotted line connecting the center of gravity $G_B$ of the rotor blade 20 and the center of gravity $G_D$ of the rotor disk 10 is the radial direction D of the aeroengine.

(ii) After the rotor blade 20 and the rotor disk 10 complete the tumble cooling, during the high-speed rotation of the rotor disk 10 together with the rotor blade 20 thereon, a leading edge 21 and a trailing edge 22 of the rotor blade 20 will have different radial displacement due to centrifugal force. At this time, a leading edge deformation amount $\Delta_1$ of the leading edge 21 of the rotor blade 20 and a trailing edge deformation amount $\Delta_2$ of the trailing edge 22 of the rotor blade 20 are measured.

Figure 2:
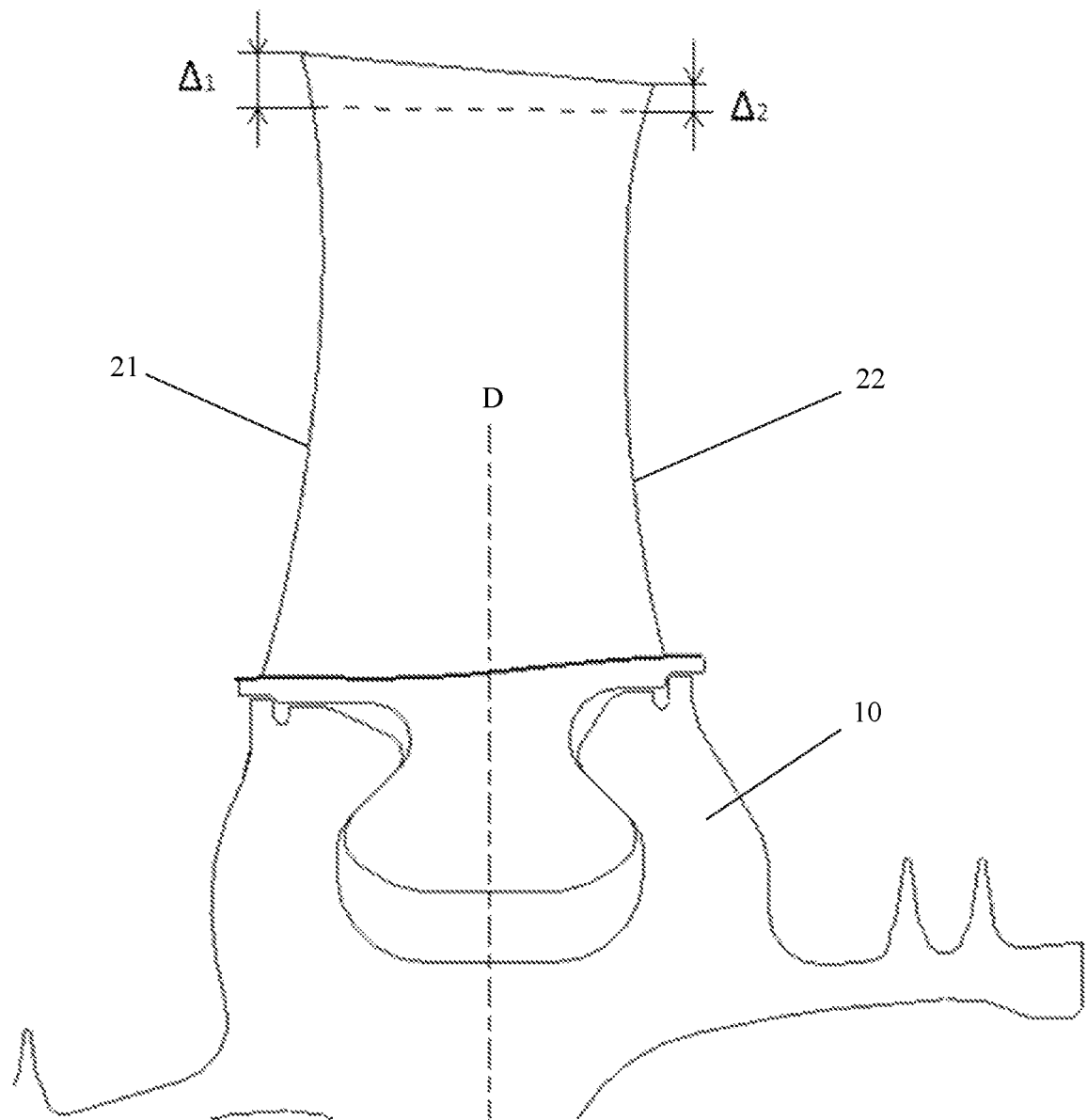
FIG. 2 is an enlarged schematic diagram of the rotor blade mounted on the rotor disk shown in FIG. 1.

As shown in FIG. 2, the rotor blade 20 is mounted on the rotor disk 10 shown in FIG. 1, wherein the dashed line shows the position of the rotor blade 20 at a stationary state, and the solid line shows the position of the rotor blade 20 at a rotating state. The leading edge deformation amount $\Delta_1$ of the leading edge 21 and the trailing edge deformation amount $\Delta_2$ of the trailing edge 22 can be measured by a deformation measuring device known in the art, such as a deformation modulus tester available in the market.

(iii) When the difference between the leading edge deformation amount $\Delta_1$ and the trailing edge deformation amount $\Delta_2$ measured is larger than a specified range, the leading edge deformation amount $\Delta_1$ and the trailing edge deformation amount $\Delta_2$, the leading edge deformation amount $\Delta_1$ and the trailing edge deformation amount $\Delta_2$ would be compared to figure out which one of the leading edge 21 and the trailing edge 22 has a smaller amount of deformation.

It should be noted that the 'specified range' mentioned above is specified as follows:

For a blade with a blade height less than 20 mm, the specified range is 0.5%-1.5% of the blade height;

For a blade with a blade height between 20 mm to 40 mm, the specified range is 0.25%-2% of the blade height;

For a blade with a blade height between 40 mm to 100 mm, the specified range is 0.2%-1% of the blade height;

For a blade with a blade height greater than 100 mm, the specified range is 0.2%-0.6% of the blade height.

Figure 4:
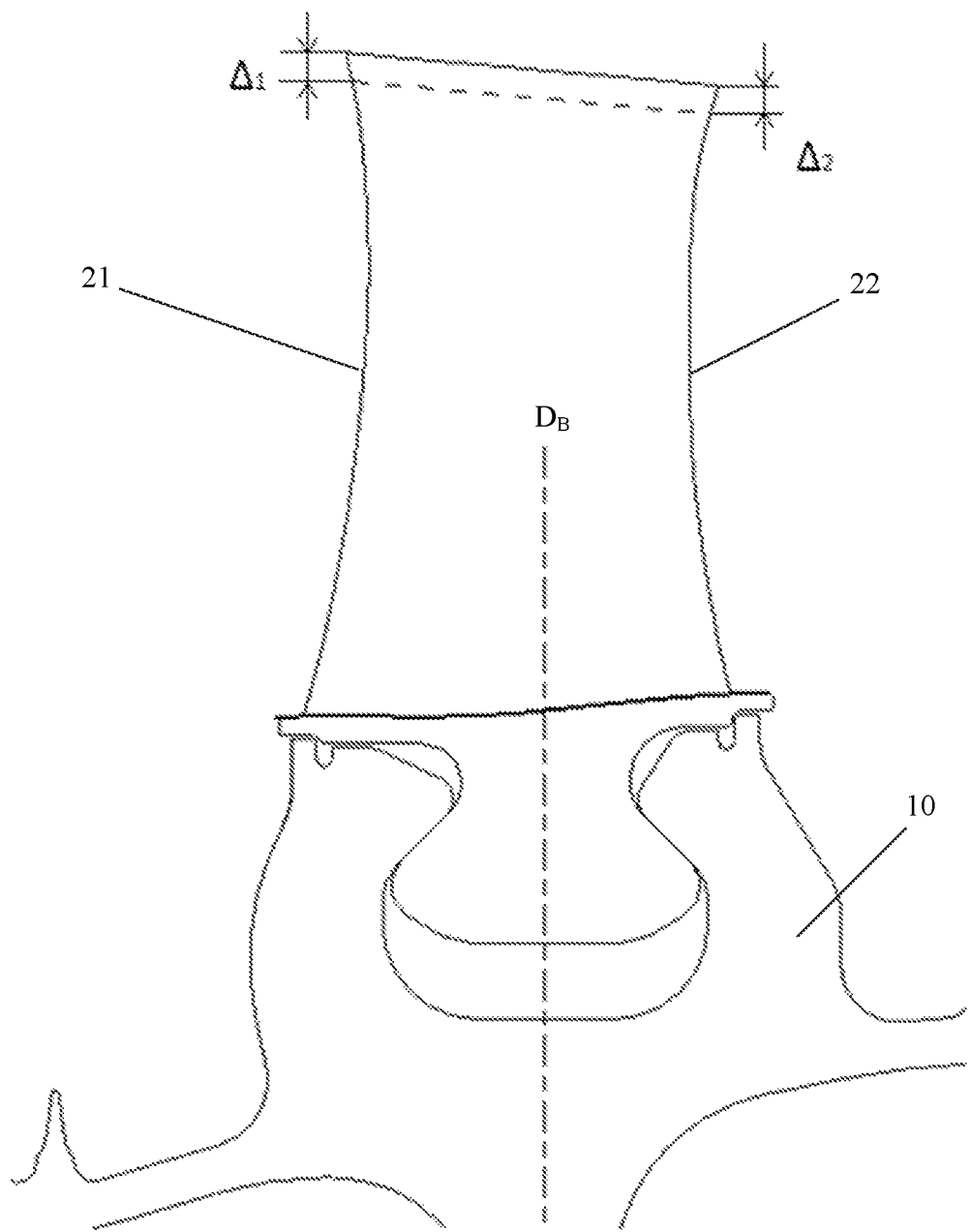
FIG. 4 is an enlarged schematic diagram of the rotor blade mounted on the rotor disk shown in FIG. 3.

(iv) Adjust the center of gravity $G_D$ of the rotor disk 10 according to the results after comparing, until the leading edge deformation amount $\Delta_1$ and the trailing edge deformation amount $\Delta_2$ tends to be approximately the same. Similar to FIG. 2, the dashed line in FIG. 4 shows the position of the rotor blade 20 at the stationary state, and the solid line shows the position of the rotor blade 20 at the rotating state. At this time, the variation of the rotor blade tip clearance reaches the design objective.

More specifically, it is found after simulation experiments that when the center of gravity $G_D$ of the rotor disk 10 is offset towards the side close to the leading edge 21 of the rotor blade tip relative to the center of gravity $G_B$ of the rotor blade 10, the leading edge deformation amount $\Delta_1$ of the leading edge 21 of the rotor blade tip is larger than the trailing edge deformation amount $\Delta_2$ of the trailing edge 22 of the rotor blade tip. Conversely, when the center of gravity $G_D$ of the rotor disk 10 is offset towards the side close to the trailing edge 22 of the rotor blade tip relative to the center of gravity $G_B$ of the rotor blade 10, the leading edge deformation amount $\Delta_1$ of the leading edge 21 of the rotor blade tip is smaller than the trailing edge deformation amount $\Delta_2$ of the trailing edge 22 of the rotor blade tip. Therefore, in the (iv) step mentioned above, the center of gravity $G_D$ of the rotor disk 10 can be adjusted by offsetting the center of gravity $G_D$ of the rotor disk 10 towards one of the leading edge and the trailing edge which has a smaller deformation amount by a predetermined offset amount.

Figure 3:
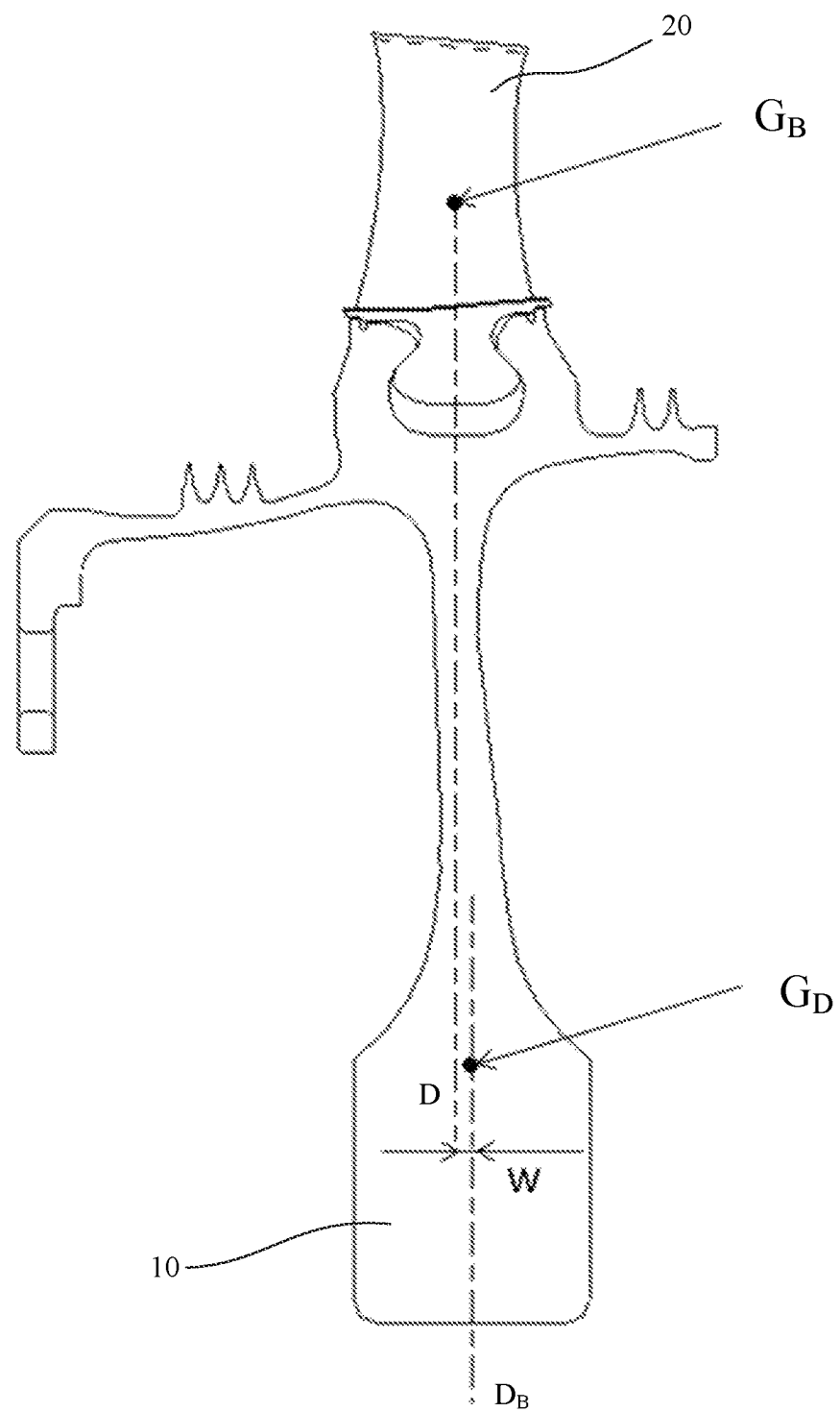
FIG. 3 is similar to FIG. 1, but with offsetting the center of gravity of the rotor disk.

As shown in FIG. 3, the rotor disk 10 with offset of the center of gravity $G_D$ is shown. It can be seen that the center of gravity $G_D$ of the rotor disk 10 was located in the axial direction of the engine originally. After offsetting the center of gravity $G_D$, the center of gravity $G_D$ has been shifted onto the direction of a line connecting the centers of gravity after the offset, and the offset amount is shown by an arrow in FIG. 3. The problem of inconsistent radial displacement of the leading edge 21 and the trailing edge 22 during the operation of rotor blade tip can be improved or even solved by the offset adjustment mentioned above.

Since a relative offset amount w between the center of gravity $G_D$ of the rotor disk 10 and the center of gravity $G_B$ of the rotor blade 10 and/or the rotor speed affect the difference in radial displacement between the leading edge 21 and the trailing edge 22 of the rotor blade 20 comprehensively during the operation of aeroengine, a suitable relative offset amount w between the center of gravity $G_D$ of the rotor disk 10 and the center of gravity $G_B$ of the rotor blade 10 can be chosen based on the range of rotor speed, and the desired difference in radial displacement between the leading edge 21 and the trailing edge 22 of the rotor blade 20 can be obtained, thereby the radial deformation amount $\Delta_1$ and $\Delta_2$ of the leading edge 21 and the trailing edge 22 tends to be approximately the same during the operation of rotor blade tip.

It should be noted that the term 'approximately the same' used herein does not mean that the numerical values have to be equal in the strict sense, but the numerical values have the same order of magnitude and are substantially close to each other within an allowable uncertainty range. In other words, as long as the numerical values are substantially close to each other within the allowable uncertainty range, it can be considered that the deformation amount $\Delta_1$ and $\Delta_2$ tends to be approximately the same.

A plurality of rotor blades 20 for aeroengine can be manufactured by the control method mentioned above. The rotor blades 20 are provided on the rotor disk 10, which has a feature of center of gravity offset, along the circumferential direction of the rotor.

The feature of center of gravity offset is achieve by at least one of the following methods:

(i) a predetermined offset amount w is provided between the center of gravity $G_D$ of the rotor disk 10 and the center of gravity $G_B$ of the rotor blade 20 in the axial direction D of the aeroengine;

(ii) a centerline of symmetry of the rotor disk 10 is substantially perpendicular to the axial direction D of the aeroengine, that is, the centerline of symmetry of the rotor disk 10 is not strictly perpendicular to the axial direction of the engine, but rather presents an acute angle or obtuse angle close to 90°;

(iii) an asymmetric feature of the rotor disk 10.

Although the method for controlling rotor blade tip clearance of the invention and the rotor blade manufactured by the method have been described above with reference to the preferred embodiments, those skilled in the art should understand that the above embodiments are only for illustration, but not as a limitation of the invention. Therefore, modifications and variations of the present invention can be made within the essential spirit of the claims, and these modifications and variations will fall within the scope of protection as claimed in the claims of the invention.

What is claimed is:

1. A method for controlling rotor blade tip clearances in an aeroengine, comprising:
   setting a center of gravity of a rotor blade to be overlapped with a center of gravity of a rotor disk in an axial direction of the aeroengine;
   rotating the rotor disk;
   measuring a leading edge deformation amount of a leading edge of the rotor blade;
   measuring a trailing edge deformation amount of a trailing edge of the rotor blade;
   comparing the leading edge deformation amount and the trailing edge deformation amount when a difference between the leading edge deformation amount and the trailing edge deformation amount is larger than a specified range; and
   adjusting the center of gravity of the rotor disk based on the comparison of the leading edge deformation amount and the trailing edge deformation amount, until the leading edge deformation amount and the trailing edge deformation amount tends to be approximately the same,
   wherein adjusting the center of gravity of the rotor disk comprises offsetting the center of gravity of the rotor disk towards one of the leading edge and the trailing edge which has a smaller deformation amount by a predetermined offset amount.

2. The method of claim 1, wherein the predetermined offset amount depends on a rotating speed of the rotor disk.

3. The method of claim 1, wherein:
   for blade heights of less than 20 mm, the specified range is 0.5%-1.5% of a height of the rotor blade;
   for blade heights between 20 mm and 40 mm, the specified range is 0.25%-2% of the height of the rotor blade;
   for blade heights between 40 mm and 100 mm, the specified range is 0.2%-1% of the height of the rotor blade; and
   for blade heights greater than 100 mm, the specified range is 0.2%-0.6% of the height of the rotor blade.

4. The method of claim 1, wherein the rotor blade is part of a booster compressor.

5. The method of claim 1, wherein the leading edge deformation amount of the leading edge of the rotor blade and the trailing edge deformation amount of the trailing edge of the rotor blade are measured by a deformation modulus tester.

6. An aeroengine comprising a rotor blade, wherein the aeroengine is configured to:
   set a center of gravity of the rotor blade to be overlapped with a center of gravity of a rotor disk in an axial direction of the aeroengine;
   rotate the rotor disk;
   measure a leading edge deformation amount of a leading edge of the rotor blade;
   measure a trailing edge deformation amount of a trailing edge of the rotor blade;
   compare the leading edge deformation amount and the trailing edge deformation amount when a difference between the leading edge deformation amount and the trailing edge deformation amount is larger than a specified range; and
   adjust the center of gravity of the rotor disk based on the comparison of the leading edge deformation amount and the trailing edge deformation amount, until the leading edge deformation amount and the trailing edge deformation amount tends to be approximately the same,
   wherein adjusting the center of gravity of the rotor disk comprises offsetting the center of gravity of the rotor disk towards one of the leading edge and the trailing edge which has a smaller deformation amount by a predetermined offset amount.

* * * * *